US 006588471B2

(12) United States Patent
Majumdar et al.

(10) Patent No.: US 6,588,471 B2
(45) Date of Patent: Jul. 8, 2003

(54) TIRE PREPARATION USING PARTIALLY PRE-CURED COMPONENT

(75) Inventors: Ramendra Nath Majumdar, Hudson, OH (US); Joseph Padovan, Akron, OH (US); Marvin Wayne Tipton, Akron, OH (US); Douglas Blair Dotts, Mogadore, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 141 days.

(21) Appl. No.: 09/808,464

(22) Filed: Mar. 14, 2001

(65) Prior Publication Data

US 2002/0179214 A1 Dec. 5, 2002

(51) Int. Cl.[7] .......................... B60C 1/00; B60C 11/00; B60C 15/06; B29D 30/56
(52) U.S. Cl. ...................... 152/209.6; 152/541; 156/96
(58) Field of Search .......................... 152/209.5, 209.6, 152/905, 541, 547; 156/96

(56) References Cited

U.S. PATENT DOCUMENTS

| 5,426,155 | A | * | 6/1995 | Hogt et al. | |
|---|---|---|---|---|---|
| 5,503,940 | A | | 4/1996 | Majumdar et al. | 429/402 |
| 5,975,440 | A | * | 11/1999 | Watson | |
| 6,329,457 | B1 | * | 12/2001 | Datta et al. | |
| 6,380,269 | B1 | * | 4/2002 | Benko et al. | |
| 2001/0018944 | A1 | * | 9/2001 | Mizuno | |
| 2002/0062894 | A1 | * | 5/2002 | Miner et al. | |

FOREIGN PATENT DOCUMENTS

EP           988999          * 3/2000

* cited by examiner

*Primary Examiner*—Steven D. Maki
(74) *Attorney, Agent, or Firm*—Henry C. Young, Jr.

(57) ABSTRACT

The present invention relates to preparation an article of manufacture, such as of a tire, via application of at least one partially pre-cured component. Tires are often prepared with pre-cured, pre-shaped components such as for example, application of pre-cured tread strips to a cured carcass as in the case of re-treaded tires. Thus precured tread and cured carcass are joined together using a cushion gum followed by heating the resulting assembly at an elevated temperature to cure the cushion gum. Such pre-cured component may also be, for example, a sidewall apex. In such cases, the pre-cured component is subjected to more heat than is necessary which may be detrimental for the component. This invention is directed to the use of a partially pre-cured component to prepare a tire assembly prior to the curing of the entire components of the tire assembly.

8 Claims, No Drawings

TIRE PREPARATION USING PARTIALLY PRE-CURED COMPONENT

FIELD OF THE INVENTION

The present invention relates to preparation of an article of manufacture, such as a tire via application of at least one partially pre-cured component. Tires are often prepared with pre-cured, pre-shaped components such as for example, application of pre-cured tread strips to a cured carcass as in the case of re-treaded tires. Thus precured tread and cured carcass are joined together using a cushion gum followed by heating the resulting assembly at an elevated temperature to cure the cushion gum. Such pre-cured component may also be, for example, a sidewall apex. In such cases, the pre-cured component is subjected to more heat than is necessary which may be detrimental for the component. This invention is directed to the use of a partially pre-cured component to prepare a tire assembly prior to the curing of the entire components of the tire assembly.

BACKGROUND OF THE INVENTION

For preparation of a retreaded tire, a pre-cured, shaped, tread rubber strip is conventionally applied to a cured tire carcass with a thin uncured rubber layer, often referred to as a cushion gum layer, positioned between said pre-cured rubber tread strip and said cured tire carcass to form an assembly thereof The tire assembly is then cured by heating at an elevated temperature in an enclosed autoclave. Such method of retreading tires is well known to those having skill in such art.

Similarly, pre-cured, shaped, rubber tire sidewall apexes are built into a tire assembly and the assembly cured at an elevated temperature in a suitable mold. The building of pre-cured rubber apexes into a tire assembly is also well known to those having skill in such art.

Partially pre-cured rubber components for such tread strips and tire (sidewall) apexes are not used for commercial preparation of tires because of blows, or voids, typically occurring in such tread strips, and they remain when they are subsequently subjected to the additional heating cycle to fully cure the shaped and pre-cured rubber compositions.

Such blows, or voids, are usually in a form of a multiplicity of small and large voids, usually small voids somewhat similar to a region of a closed cellular configuration, within the pre-cured rubber tread strip or apex, as the case may be, which may not be visible on the surface thereof. Apparently, cured tread strips or tread apexes, as the case may be, for use in building, and subsequently curing, a tire assembly do not normally contain such blows.

While the causes of the formation of such blows, or voids, in a partially pre-cured tread strip is not fully understood, it is important to appreciate that blows, or voids, may form, for example, due to one or more of the following three causes:

(A) Volatile ingredients may form by a degradation of one or more materials in the rubber composition which try to escape upon removal of the partially pre-cured rubber composition from the high pressure and high temperature environment of the mold in which it has been partially pre-cured.

(B) Partially pre-cured rubber compositions have a lower modulus as compared to a comparable fully cured rubber composition and therefore have less resistance to blow, or void, formation.

(C) Presence of moisture or other volatile ingredients within the rubber composition try to expand upon its removal from the high pressure and high temperature environment of the mold in which the rubber composition has been partially pre-cured.

This invention is directed to the preparation of a tire via use of partially pre-cured rubber compositions, for example tread strips and/or sidewall apexes, in the manufacture of tires, including retreaded tires in the case of partially pre-cured tread strips, in which such blows are at least minimized, and preferably essentially eliminated, and therefore intended to be at least equivalent to the use of pre-cured rubber components.

During the subsequent curing of the partially cured rubber composition, the modulus of rubber composition gradually increases with time during the curing step from the lower modulus condition of the partially cured rubber composition.

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

In the description of this invention, the term "phr" refers to parts of a respective material per 100 parts by weight of rubber, or elastomer. The terms "rubber" and "elastomer" may be used interchangeably unless otherwise indicated. The terms "cure" and "vulcanize" may be used interchangeably unless otherwise indicated.

SUMMARY AND PRACTICE OF THE INVENTION

In accordance with this invention, an article of manufacture is prepared by:

(A) partially sulfur curing a sulfur curable rubber composition in a partially curing step to from about 10 to about 80, alternately about 50 to about 70 percent of its cured condition, particularly where said partially cured rubber composition is in a form of a rubber tread strip for retreading a cured rubber carcass or sidewall rubber insert such as an apex, within in a rigid mold at a temperature in a range of about 120° C. to about 200° C.;

(B) removing said partially cured rubber composition from said mold and allowing said partially cured rubber composition to cool to a temperature of less than 50° C.;

(C) applying said partially pre-cured rubber composition to an uncured, sulfur curable, rubber composition to form an assembly thereof;

(D) sulfur curing said assembly in a suitable container, for example an autoclave or mold, in a curing step at a temperature in a range of about 120° C. to about 200° C., and (E) removing said sulfur cured assembly from said mold in a subsequent cooling step to allowing said cured assembly to cool to a temperature of less than 40° C.;

wherein for said partially cured rubber composition:

(1) said partially curing and cooling steps for said partially cured rubber composition are conducted in a nitrogen atmosphere to the exclusion of oxygen, (2) said partially cured rubber composition contains from about 0.1 to about 3 phr of bis-imide selected from at least one of N,N'-m-xylylene-bis-citraconimide and N,N'-m-phenylene bismaleimide, and/or (3) said partially cured rubber composition is immediately, preferably within about 0.5 to about 10, and more preferably within 0.5 to 5, seconds following removal from said mold, immersed in water, said water having a temperature within about 0° C. to about 20° C. to rapidly cool the partially cured rubber composition to a temperature of less than 100° C.

In one aspect of the invention, said partially cured rubber composition may be a sidewall insert and particularly a tire sidewall insert in a form of an apex.

In one aspect of the invention, said partially cured rubber composition can contain said bis-amide and said partially curing and cooling steps are conducted in a nitrogen atmosphere to the exclusion of oxygen.

In one aspect of the invention, said partially cured rubber composition can contain said bis-amide and said partially cured rubber composition is immediately, preferably within about 0.5 to about 10, and more preferably within 0.5 to 5, seconds following removal of said assembly from its mold, immersed in water, said water having a temperature within about 0° C. to about 20° C. to rapidly cool the assembly to a temperature of less than 100° C.

In one aspect of the invention, said partially cured rubber composition may be simply immediately, preferably within about 0.5 to about 10, and more preferably within 0.5 to 5, seconds following removal from said mold, immersed in water, said water having a temperature within about 0° C. to about 20° C. to rapidly cool the partially cured rubber composition to a temperature of less than 100° C.

In further practice of this invention, a tire is provided which comprises (A) partially sulfur curing a sulfur curable rubber tread strip in a partially curing step to from about 10 to about 80, alternately about 50 to about 70 percent of its fully cured condition within a rigid mold at a temperature in a range of about 120° C. to about 200° C.;

(B) removing said partially cured rubber tread strip from said mold and allowing said partially cured rubber tread strip to cool to a temperature of less than 40° C.;

(C) applying a thin, sulfur curable, uncured diene rubber based cushion rubber strip circumferentially around the circumference of a carcass of a sulfur cured rubber tire;

(D) applying said partially cured rubber tread strip onto said cushion rubber strip to form a tire assembly thereof;

(E) sulfur curing said assembly in a suitable container at a temperature in a range of about 120° C. to about 200° C., to form a treaded tire; and (F) removing said tire from said mold;

wherein, for said partially cured rubber tread strip (1) said partially curing and cooling steps for said partially cured rubber tread strip are conducted in a nitrogen atmosphere to the exclusion of oxygen, (2) said partially cured tread strip rubber composition contains from about 0.1 to about 3 phr of said bis-amide blended therewith, and/or (3) said partially cured rubber tread strip immediately, preferably within about 0.5 to about 10, and more preferably within 0.5 to 5, seconds following removal of from said mold, immersed in water, said water having a temperature within about 0° C. to about 20° C. to rapidly cool the tread strip to a temperature of less than 100° C.

In one aspect of the invention, said tire is a re-treaded tire in which said cured tire carcass is first prepared by abrading away a rubber tread from a cured tire's supporting cured carcass.

In one aspect of the invention, said partially cured rubber composition (e.g. said partially cured tread rubber strip) can contain said bis-amide and said assembly (e.g. said tire assembly) be heated and cooled in said curing and cooling steps in a nitrogen atmosphere to the exclusion of oxygen.

In one aspect of the invention, said partially cured rubber composition (e.g. said partially cured tread rubber strip) can contain said bis-amide and said assembly (e.g. said tire assembly) is immediately, preferably within about 0.5 to about 10, and more preferably within 0.5 to 5, seconds following removal of said assembly mold from said container after said curing step, immersed in water, said water having a temperature within about 0° C. to about 20° C. to rapidly cool the assembly to a temperature of less than 100° C.

In one aspect of the invention, said assembly (e.g. said tire assembly) may be simply immediately, preferably within about 0.5 to about 10, and more preferably within 0.5 to 5, seconds following removal of said assembly from said container after said curing step, immersed in water, said water having a temperature within about 0° C. to about 20° C. to rapidly cool the assembly to a temperature of less than 100° C.

A significant aspect of partially pre-curing the tread strip is heating and cooling in a nitrogen atmosphere to the exclusion of oxygen is to prevent degradation. Degradation is viewed herein as generating low molecular weight volatile materials that tend to expand within the rubber composition thereby resulting in a formation of blows or voids.

This is considered herein to be significant because production rate of articles of manufacture, such as for example tires, may be effected to only partially pre-curing a rubber component thereof instead of using a more lengthy time required for more fully curing the rubber component.

A significant aspect of including the bis-imide in the rubber strip composition is to prevent, or at least substantially retard, de-vulcanization of the rubber composition of the partially pre-cured, rubber during the cooling step after curing the said assembly, which thereby retards any volatile material to expand within the rubber composition and thereby form blows, or voids, within the rubber composition.

This is considered herein to be significant because often a combination of nitrogen atmosphere and bis-imide may be needed to more effectively eliminate visible blows.

The N,N'-m-xylylene-bis-citraconimide may be obtained, for example, as Perkalink® 900 from Flexsys America L.P.

The N,N'-m-phenylene bis-malemide may be obtained, for example, as HVA-2® from the duPont company.

A significant aspect of rapid immersion of the partially pre-cured rubber strip immediately in water after removal from the mold is to increase the modulus thus suppressing volatiles to expand and form blows within the rubber composition. Moreover, thermal degradation during the cooling step of the cured assembly is retarded by rapid cooling thus generating less volatiles.

In practice, the rapid immersion of the partially pre-cured rubber strip immediately in water after removal from the mold may be accomplished, for example, by (A) directing a stream of water onto the rubber strip or (B) causing the rubber strip to be immersed within a container of water by, for example, dropping the partially pre-cured strip directly into a container of water.

It is recognized that it is well known to use various materials, and amounts of various individual materials, for such partially pre-cured rubber strips such as, for example, carbon black reinforcement, amorphous silica (e.g. precipitated silica) reinforcement, rubber processing oil and anti-degradants (particularly antioxidants), as well as individual elastomers, for example, cis 1,4-polyisoprene natural and synthetic rubber, cis 1,4-polybutadiene rubber and styrene/butadiene copolymer rubber.

It is to be appreciated that the prepared tread rubber composition is appropriately and conventionally extruded through a suitable extruder die to form a parallelopoid shaped tread stock strip. The shaped tread stock strip is pre-cured (partially pre-cured for the practice of this invention) in a mold at 120° C. to 200° C. The pre-cured tread and pre-cured carcass are placed together with an intermediate cushion layer followed by curing.

A cured rubber composition, for the purposes of the discussion for this invention, is a sulfur cured rubber composition, conventionally a sulfur cured diene-based rubber, which has been cured to a substantial inflection of its modulus (y axis) versus time (x axis) curve. In particular, such curve conventionally is a curve with a positive slope which rises over time until it experiences a substantial inflection in a manner that its slope reaches a plateau where it becomes substantially horizontal. In such region of a slope transition, which is somewhat of a maximization of the slope, although the slope might still very gradually rise, it is considered that the rubber composition is fully cured. It is believed this is recognized by those having skill in such art. For the purposes of this invention, a partially sulfur cured rubber composition, as hereinbefore mentioned, is a rubber composition which is cured to only about 10 to about 80, alternately about 50 to about 70 percent of the time to reach such fully cured condition. Of course, such time will depend upon the nature of the rubber composition itself as well as the curing temperature. A partially cured rubber composition, particularly a partially sulfur cured diene-based elastomer composition, will have lower crosslink density than a comparable fully cured rubber composition which can be measured quantitatively, if desired.

The diene-based elastomers for the partially pre-cured rubber article (e.g. tread strip) may be, for example, homopolymers and copolymers of at least one conjugated diene such as, for example, isoprene and/or 1,3-butadiene and copolymers of at least one conjugated diene, such as for example, isoprene and/or 1,3-butadiene, and a vinyl aromatic compound such as styrene or alpha-methylstyrene, preferably styrene.

Representative of such diene-based elastomers are, for example, elastomers comprised of cis 1,4-polyisoprene (natural and synthetic), cis 1,4-polybutadiene, high vinyl polybutadiene having a vinyl 1,2-content in a range of about 35 to about 90 percent, isoprene/butadiene copolymer elastomers, styrene/butadiene copolymer elastomers (organic solvent solution polymerization formed or prepared and aqueous emulsion polymerization formed or prepared) and styrene/isoprene/butadiene terpolymer elastomers.

Synthetic amorphous silicas are usually aggregates of precipitated silicas for use in this invention although they may be fumed silicas or even co-fumed silica and carbon black. Precipitated silicas are, for example, those obtained by the acidification of a soluble silicate, e.g., sodium silicate, including blends of a sodium silicate and aluminate. Such precipitated silicas are well known to those having skill in such art.

Such amorphous, particularly precipitated, silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) adsorption value in a range of about 100 to about 400, and more usually about 150 to about 300 ml/100 g.

The silica is conventionally used in conjunction with a silica coupler as hereinbefore discussed to couple the silica to at least one of said diene-based elastomers and, thus, enhance the elastomer reinforcing effect of the silica.

It is readily understood by those having skill in the art that the rubber composition would be compounded by methods generally known in the rubber compounding art, such as mixing the various sulfur-vulcanizable constituent rubbers with various commonly used additive materials, as herein before discussed, as known to those skilled in the art, depending on the intended use of the sulfur vulcanizable and sulfur vulcanized material (rubbers), the various additives, unless otherwise indicated, are selected and commonly used in conventional amounts.

Representative of phenolic antidegradants for use in this invention are, for example, antioxidants such as polymeric hindered phenols from The Goodyear Tire & Rubber Company and Exxon Mobil, including phenolic antidegradants disclosed in *The Vanderbilt Rubber Handbook* (1978), Pages 344 through 346.

Representative non-aromatic rubber processing oils for use in this invention, namely such oils which contain less than 14 percent weight aromatic compounds, if at all, are, for example, Flexon 641 from Exxon Mobile.

Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization (e.g. curing) is conducted in the presence of a sulfur vulcanizing agent. Examples of suitable sulfur vulcanizing agents include elemental sulfur (free sulfur) or sulfur donating vulcanizing agents, for example, a polymeric polysulfide. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

The mixing of the rubber composition can preferably be accomplished by the aforesaid sequential mixing process. For example, the ingredients may be mixed in at least three stages, namely, at least two non-productive (preparatory) stages followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

The invention may be better understood by reference to the following examples in which the parts and percentages are by weight unless otherwise indicated.

EXAMPLE I

Rectangular shaped blocks of rubber samples are prepared by sulfur curing rubber samples in a metal molds having a mold cavities with dimensions of 12.5×12.5×2 cm at a temperature of about 182° C. and identified herein as Samples A through E.

Control Sample A was cured under a normal atmosphere, (comprised of nitrogen, oxygen and carbon dioxide gases), for a period of about 15 minutes, which is considered herein as being fully cured.

Sample B was only partially cured by curing the sample in the mold for about 10 minutes under a normal atmosphere, (comprised of nitrogen, oxygen and carbon dioxide gases) following which it was removed from the mold and cooled to room temperature of about 23° C. under such normal atmosphere.

Sample C was also partially cured by curing the sample for about 10 minutes. However Sample C was partially cured under a nitrogen atmosphere to the exclusion of oxygen. Following its removal from the mold, Sample C was cooled to room temperature of about 23° C. under such nitrogen atmosphere to the exclusion of oxygen.

Sample D was also partially cured by curing the sample for about 10 minutes. However, Sample D was cured under a normal atmosphere, (comprised of nitrogen, oxygen and carbon dioxide gases), and, upon removal from the mold, was rapidly cooled to room temperature by immediately dropping the hot rubber block (about 180° C.) in ice cold water (about zero degrees C.).

Sample E was partially cured in the manner of Sample B except that Sample E contained N,N'-m-xylylene-bis-citraconimide (partially cured under a normal atmosphere).

Sample F was partially cured in the manner of Sample D except that Sample F contained N,N'-m-xylylene-bis-citraconimide (partially cured under a normal atmosphere and immediately dropped into ice water upon removal from its mold).

Ingredients for the samples are illustrated in the following Table 1. The ingredients were first mixed in a preliminary non-productive mixing step in an internal rubber mixer (without the sulfur and accelerator curatives) until a drop temperature of about 128° C. was reached, upon which the rubber mixture was dropped, or removed, from the rubber mixer.

In a subsequent productive mixing step sulfur and accelerator were mixed therewith in an internal rubber mixer until a temperature of about 110° C. was reached, upon which the rubber mixture was dropped, or removed, from the rubber mixer.

After each of the above mixing steps, the rubber mixture was allowed to cool to below 40° C., usually after a short open mill mixing.

The overall mixing procedure involving one or more non-productive mixing steps at a higher temperature followed by a productive mixing step for the sulfur and accelerator at a lower temperature is well known to those having skill in such art.

TABLE 1

|  | Control | | | | | |
|---|---|---|---|---|---|---|
| Sample | A | B | C | D | E | F |
| First Non-Productive Mixing Step | | | | | | |
| SBR[1] | 50 | 50 | 50 | 50 | 50 | 50 |
| Polybutadiene rubber[2] | 50 | 50 | 50 | 50 | 50 | 50 |
| Carbon black | 64.5 | 64.5 | 64.5 | 64.5 | 64.5 | 64.5 |

TABLE 1-continued

|  | Control | | | | | |
|---|---|---|---|---|---|---|
| Sample | A | B | C | D | E | F |
| Processing oil and wax | 32 | 32 | 32 | 32 | 32 | 32 |
| Zinc oxide | 3 | 3 | 3 | 3 | 3 | 3 |
| Productive Mixing Step | | | | | | |
| Sulfur, accelerator and retarder | 4 | 4 | 4 | 4 | 4 | 4 |
| Antidegradant(s)[3] | 2 | 2 | 2 | 2 | 2 | 2 |
| Bis-imide[4] | 0 | 0 | 0 | 0 | 4.11 | 4.11 |

[1]Styrene butadiene rubber prepared by emulsion polymerization and having a styrene content of 23.5 percent
[2]Cis 1,4-polybutadiene rubber
[3]Amine type
[4]N,N'-m-xylylene-bis-citraconimide as Perkalink ® 900, from the Flexsys Company Portions of the Samples were cut and the inside cut surfaces were visually inspected and the visually observed blows, or extent of formation of voids, is reported in the following Table 2.

TABLE 2

|  | Control | | | | | |
|---|---|---|---|---|---|---|
| Sample | A | B | C | D | E | F |
| Preparation Conditions | 15' cure Air cooled | 10' cure Air cooled | 10' cure Nitrogen cooled | 10' cure Ice water cooled | Bis-imide 10' cure Air cooled | Bis-imide 10' cure Ice water cooled |
| Blows, or voids | None | Substantial | Negligible | Negligible | Negligible | None |

From Table 2 it can be seen that the fully cured Control Sample A did not have visible blows, or voids.

From Table 2, it can be seen that Sample B, partially cured under atmospheric conditions had very substantial blows. This is believed to be a result of exposure of the partially cured rubber sample, of a lower modulus as compared to the fully cured Control Sample A, to the presence of atmospheric oxygen upon removal from the mold and cooling to room temperature.

From Table 2, it can be seen that Samples C, D and E showed only a negligible formation of blows as a result of use of a nitrogen atmosphere to the exclusion of oxygen (Sample C), quick cooling to rapidly toughen the rubber and to therefore inhibit the expansion of any formed degradation gaseous products as a result of exposure to atmospheric oxygen (Sample D) or inclusion of an anti-reversion agent to inhibit formation of lower modulus rubber composition due to rubber devulcanization of the partially cured rubber to atmospheric oxygen (Sample E).

From Table 2, it can be seen that no blows were visually observed when a combination of inclusion of an anti-reversion agent as well as quick cooling the partially cured rubber sample was employed.

EXAMPLE II

Samples A through F were subsequently submitted to an additional heating step to more fully cure the samples in order to simulate a use of such rubber compositions in a tire retreading operation. For such additional heating step, the rubber Samples were heated in a plastic envelope at a temperature of about 128° C. for about 3 hours.

The Samples were then removed from the envelope, cooled under atmospheric conditions to room temperature, or about 23° C., and a cylindrical core having a diameter of about 1⅜ inches (about 3.5 cm) was cut from each of the Samples.

Weight and volumes of the individual cylinders were used to calculate the densities of the individual Samples. Presence of blows, or voids, in the Samples were visually observed by viewing the cut cylinder and the qualitative results are reported in Table 3.

TABLE 3

| Sample | Control | | | | | |
|---|---|---|---|---|---|---|
| | A | B | C | D | E | F |
| Preparation Conditions | 15' cure Air cooled | 10' cure Air cooled | 10' cure Nitrogen cooled | 10' cure Ice water cooled | Bis-imide 10' cure Air cooled | Bis-imide 10' cure Ice water cooled |
| Density | 1.06 | 0.98 | 1.05 | 1.05 | 1.06 | 1.09 |
| Blows or voids | None | Substantial | Negligible | Negligible | Negligible | None |

From Table 3 it can be seen that the existence of blows remained the same as for the Samples reported in Table 2.

From Table 3 it can be seen that the densities of Control Sample A as well as Samples C through F are similar, for which visually observed blows were reported as being negligible or none.

From Table 3 it can be seen that the density of Sample B is substantially lower than those of the remainder of the Samples, for which the visually observed extent of blows was reported as being substantial.

Accordingly, it is concluded herein that partially cured rubber samples can be prepared, insofar as minimal formation of visual blow formation is concerned, by conducting the curing thereof (A) in the presence of nitrogen to the exclusion of oxygen, (B) with an inclusion of the bis-imide in its rubber composition and/or (C) quick cooling the partially cured rubber composition upon its removal from its mold.

EXAMPLE III

Rubber tread samples were prepared of the formulation illustrated in Example I for Control Sample A and Samples B and D and identified herein as, correspondingly, Control Tread Sample AA and Tread Samples BB and DD.

Control Tread Sample AA was cured at a temperature of about 190° C. for about 9.8 minutes and was considered herein as being a cured rubber Sample.

Tire Tread Samples BB and DD were cured at a temperature of about 190° C. for about 6.3 minutes and were considered herein as being partially cured rubber Samples.

The Control Tread Sample AA and Samples BB and DD were subsequently heated in a plastic envelope at a temperature of about 129° C. for about 3 hours. The Samples were removed from the envelope, cooled to room temperature, or about 23° C., and a cylindrical core sample removed from each Sample having a diameter of about 1⅜ inches (about 3.5 cm).

The core samples were then analyzed for their compression modulus by an Instron analytical machine at a crosshead speed of 2.5 mm/minute and recited in the following Table 4 in terms of force (MPa) for 15 percent and 30 percent compression.

TABLE 4

| Tread Sample | 15% Compression Modulus (MPa) | 30% Compression Modulus (MPa) |
|---|---|---|
| Control AA[1] | 0.758 | 1.612 |
| Sample BB[2] | 0.674 | 1.434 |
| Sample DD[3] | 0.811 | 1.811 |

TABLE 4-continued

| Tread Sample | 15% Compression Modulus (MPa) | 30% Compression Modulus (MPa) |
|---|---|---|

[1]No visible blows
[2]Substantial visible blows
[3]Negligible visible blows

With regard to the 15 percent and 30 percent compression modulus, it can be seen from Table 4 that the compression modulus for partially cured, quick-cooled, Sample DD is greater than the compression modulus for the cured Control Tread Sample AA even though a negligible amount of blows were visually observed for Tread Sample DD as compared to no visible blows for Control Tread Sample AA. Thus it appears to be beneficial to quickly toughen-up the partially cured rubber sample by the quick-cooling method, insofar as minimizing blow formation and insofar as 15 percent and 30 percent compression modulus is concerned.

Contrarily, partially cured, atmosphere-cooled Tread Sample BB exhibited a substantially lower compression modulus which may be commensurate with its substantial blow, or voids, content as compared to both cured Control Tread Sample AA and quick-cooled partially cured Tread Sample DD.

Accordingly, it is considered herein that a partially cured Tread Rubber Sample can be satisfactorily prepared by the quick-cooling method, insofar as visual formation of blows is concerned, even in the presence of otherwise atmospheric conditions where oxygen is present.

While various embodiments are disclosed herein for practicing the invention, it will be apparent to those skilled in this art that various changes and modifications may be made therein without departing from the spirit or scope of the invention.

What is claimed is:

1. A method of preparing an assembly of a partially cured rubber composition and an uncured rubber composition followed by sulfur curing said assembly which comprises:

(A) partially sulfur curing a sulfur curable rubber composition to from about 10 to about 80 percent of its sulfur cured condition within a rigid mold for the partially curing thereof at a temperature in a range of about 120° C. to about 200° C.;

(B) removing said partially cured rubber composition from said rigid mold for the partially curing thereof and allowing said partially cured rubber composition to cool to a temperature of less than 40° C.;

(C) applying said partially pre-cured rubber composition to an uncured, sulfur curable, rubber composition to form an assembly thereof;

(D) sulfur curing said assembly in a suitable mold for the sulfur curing thereof at a temperature in a range of about 120° C. to about 200° C., and (E) removing said sulfur cured assembly from said mold for the sulfur curing thereof in a subsequent cooling step and allowing said cured assembly to cool to a temperature of less than 40° C.;

wherein for said partially cured rubber composition:
(1) said partially curing and cooling steps for said partially cured rubber composition are conducted in a nitrogen atmosphere to the exclusion of oxygen,
(2) said partially cured rubber composition contains from about 0.1 to about 3 phr of a bis-imide selected from N,N'-m-xylylene-bis-citraconimide and N,N'-m-phenylene bismaleimide blended therewith, and
(3) said partially cured rubber composition is immediately, following its removal from said rigid mold for the partial curing thereof, immersed in water, said water having a temperature within about 0° C. to about 20° C. to rapidly cool the partially cured rubber composition to a temperature of less than 100° C.

2. The method of claim 1 wherein said bis-imide is N,N'-m-xylylene-bis-citraconimide.

3. The method of claim 1 wherein said bis-imide is N,N'-m-phenylene bismaleimide.

4. An assembly prepared by the method of claim 1.

5. The method of claim 1 wherein said partially cured rubber composition is in a form of a tire tread.

6. An assembly prepared by the method of claim 5.

7. A tire prepared by a method which comprises (A) partially sulfur curing a sulfur curable rubber composition in a form of a tread strip to from about 10 to about 80 percent of its fully sulfur cured condition within a rigid mold for the partial curing thereof at a temperature in a range of about 120° C. to about 200° C.;

(B) removing said partially cured rubber tread strip from said rigid mold for the partial curing thereof and allowing said partially cured rubber tread strip to cool to a temperature of less than 40° C.;

(C) applying a thin, sulfur curable, uncured diene rubber based cushion rubber strip circumferentially around the circumference of a carcass of a sulfur cured rubber tire;

(D) applying said partially cured rubber tread strip onto said cushion rubber strip to form a tire assembly thereof;

(E) sulfur curing said assembly in a suitable mold for the sulfur curing thereof at a temperature in a range of about 120° C. to about 200° C., to form a treaded tire; and (F) removing said tire from said mold;

wherein, for said partially cured rubber tread strip
(1) said partially curing and cooling steps for said partially cured rubber tread strip are conducted in a nitrogen atmosphere to the exclusion of oxygen,
(2) said partially cured tread strip rubber composition contains from about 0.1 to about 3 phr of a bis-imide selected from N,N'-m-xylylene-bis-citraconimide and N,N'-m-phenylene bismaleimide blended therewith, and
(3) said partially cured rubber tread strip immediately following its removal of from said mold, is immersed in water, said water having a temperature within about 0° C. to about 20° C. to rapidly cool the tread strip to a temperature of less than 100° C.

8. A tire prepared by the method of claim 7 wherein said tire is a re-treaded tire in which said sulfur cured tire carcass is first prepared by abrading away a rubber tread from a cured tire's carcass.

* * * * *